(12) United States Patent
Lekki et al.

(10) Patent No.: US 12,407,424 B1
(45) Date of Patent: Sep. 2, 2025

(54) HERALDED SOURCE OF ENTANGLED PHOTON PAIRS

(71) Applicant: United States of America as represented by the Administrator of NASA, Washington, DC (US)

(72) Inventors: John D Lekki, Cleveland, OH (US); Yousef Kamal Chahine, Cleveland, OH (US); Evan J. Katz, Cleveland, OH (US); Ian R. Nemitz, Cleveland, OH (US); Brian E. Vyhnalek, Cleveland, OH (US)

(73) Assignee: United States Government Administrator of NASA, Washington, DC (US)

( * ) Notice: Subject to any disclaimer, the term of this patent is extended or adjusted under 35 U.S.C. 154(b) by 276 days.

(21) Appl. No.: 18/298,070

(22) Filed: Apr. 10, 2023

Related U.S. Application Data

(60) Provisional application No. 63/329,160, filed on Apr. 8, 2022.

(51) Int. Cl.
*H04B 10/00* (2013.01)
*H04B 10/07* (2013.01)
*H04B 10/70* (2013.01)
*H04J 14/00* (2006.01)

(52) U.S. Cl.
CPC ............ *H04B 10/70* (2013.01); *H04B 10/07* (2013.01)

(58) Field of Classification Search
CPC ...................................................... H04B 10/70
See application file for complete search history.

(56) References Cited

U.S. PATENT DOCUMENTS

2024/0214078 A1* 6/2024 Zhang ................ H04Q 11/0062
2024/0303521 A1* 9/2024 Gimeno-Segovia ... G06N 10/40

* cited by examiner

*Primary Examiner* — Daniel G Dobson
(74) *Attorney, Agent, or Firm* — Robert H. Earp, III; Mark Wolfgang; Trenton J. Roche (57) ABSTRACT

An apparatus includes a first pair of entanglement sources, a first Bell state measurement (BSM) device, at least one memory, a herald output, and at least one optical switch. The first pair of entanglement sources includes a first entanglement source and a second entanglement source configured to generate a first pair of entangled photons and a second pair of entangled photons at the same time. The first BSM device is connected with the first pair of entanglement sources to detect photons generated by each of the first entanglement source and the second entanglement source. The at least one memory is connected with the first pair of entanglement sources to store photons generated by the first entanglement source and the second entanglement source. The herald output includes an electronic circuit connected with the first BSM device for determining a number of photons detected by the first BSM device.

20 Claims, 1 Drawing Sheet

HERALDED SOURCE OF ENTANGLED PHOTON PAIRS

RELATED APPLICATION

This application claims priority to U.S. Provisional Patent Application No. 63/329,160 "HERALDED BRIGHT QUANTUM ENTANGLEMENT SOURCE THAT INHIBITS THE PRODUCTION OF MULTIPLE SETS OF ENTANGLED PHOTON PAIRS" to Lekki John D. et al, filed Apr. 8, 2022, the entirety of which is hereby incorporated by reference.

This work was performed by the government for governmental purposes without the payment of any royalties thereon or therefore. The invention described herein was made in the performance of work under a NASA project.

BACKGROUND

An objective of quantum communication systems is distributing entangled quantum states to remote locations. Known solutions for an entangled quantum system, which may be readily transported long distances without disturbing the quantum correlations, include entangled photon pair states such as those produced in spontaneous parametric down-conversion (SPDC). In such a process, a single pump photon is probabilistically down-converted into two photons, called signal and idler photons.

A quantum communication system can be further arranged such that signal and idler pairs of photons are produced in a correlated superposition of polarization states, thus enabling the distribution of the correlated quantum states to distant locations. Unfortunately, due to the probabilistic nature of the SPDC process, multiple pairs are typically produced with Bose-Einstein thermal statistics. In this regard, the production of double pairs introduces errors with a particularly detrimental effect when combined with lossy transmission channels where double-pair events are not as easily identified.

For example, in a quantum repeater architecture, the pair states from two different sources may be sent along lossy channels before performing an entanglement swap, making it difficult to determine from photo-detections at the end of the channels whether both sources emitted a single entangled pair, or if one of the sources produced a double-pair while no photons were received from the other source. The latter possibility can introduce significant noise into a quantum communication link when the two channels leading to the entanglement swap have imbalanced losses.

Although SPDC can be used as a source for single photons by using the detection of a single idler photon as a herald for the presence of a single signal photon, SPDC is not an ideal source of single photons due to the probabilistic nature of the down-conversion process. In particular, to make use of both down-converted photons, e.g., in an entanglement distribution protocol, such a heralding may require that one of the channels is detected with high efficiency and with photon number resolution near the source, precluding the distribution of one of the photons of the pair on a lossy transmission channel.

Notably, the use of pulsed SPDC in quantum communications applications incentivizes configuring an SPDC source to produce polarization entangled single photon pairs at a high rate. However, due to the thermal statistics associated with pair production in an SPDC source, the usual recourse for reducing the deleterious effects of multi-pair production in quantum communications applications is to reduce pump pulse power, which also reduces the single-pair probability to the point where the vast majority of the time no pairs are produced at all.

In a case where an application only uses one photon, a photon number resolved detection of the idler field may be used to produce a conditional single-photon state, i.e., the number of photons in the signal channel is conditional on a simultaneous detection of exactly one photon in the idler channel exhibiting sub-Poissonian fluctuations. Unfortunately, for applications where both photons are needed, such as in entanglement distribution, this method is of no use since detection of the idler photon destroys the idler photon in the process.

SUMMARY

According to one aspect, an apparatus includes a first pair of entanglement sources, a first Bell state measurement device, at least one memory, a herald output, and at least one optical switch. The first pair of entanglement sources includes a first entanglement source and a second entanglement source configured to generate a first pair of entangled photons and a second pair of entangled photons at a same time. The first Bell state measurement device is connected with the first pair of entanglement sources to detect photons generated by each of the first entanglement source and the second entanglement source. The at least one memory is connected with the first pair of entanglement sources to store photons generated by the first entanglement source and the second entanglement source. The herald output includes an electronic circuit connected with the first Bell state measurement device for determining a number of photons detected by the first Bell state measurement device. The at least one optical switch is connected with the at least one memory and the herald output, where the at least one optical switch is configured to selectively release photons from the at least one memory to a network based on the number of photons detected by the first Bell state measurement device.

According to another aspect, an apparatus includes a multiplex of arrays, where each array is configured to produce swap-heralded pairs of entangled photons and includes a pair of entanglement sources configured to generate two pairs of entangled photons at a same time, a Bell state measurement device connected with the pair of entanglement sources to detect photons generated by each entanglement source in the pair of entanglement sources, and at least one optical switch connected with each array, wherein the at least one optical switch is configured to selectively release photons from the pairs of entanglement sources to a network based on a number of photons detected by the corresponding Bell state measurement device.

According to another aspect, a method of providing a pair of swap-heralded photons to a network, the method including actuating a first pair of entanglement sources including a first entanglement source and a second entanglement source to generate a first pair of entangled photons and a second pair of entangled photons at a same time, detecting a number of photons generated by the first entanglement source and the second entanglement source at the same time using a first Bell state measurement device, where an entanglement swap is performed between the first pair of entangled photons and the second pair of entangled photons, releasing photons from the first pair of entangled photons and the second pair of entangled photons to a network with at least one optical switch based on the number of photons detected by the first Bell state measurement device.

DETAILED DESCRIPTION

Figure 1:
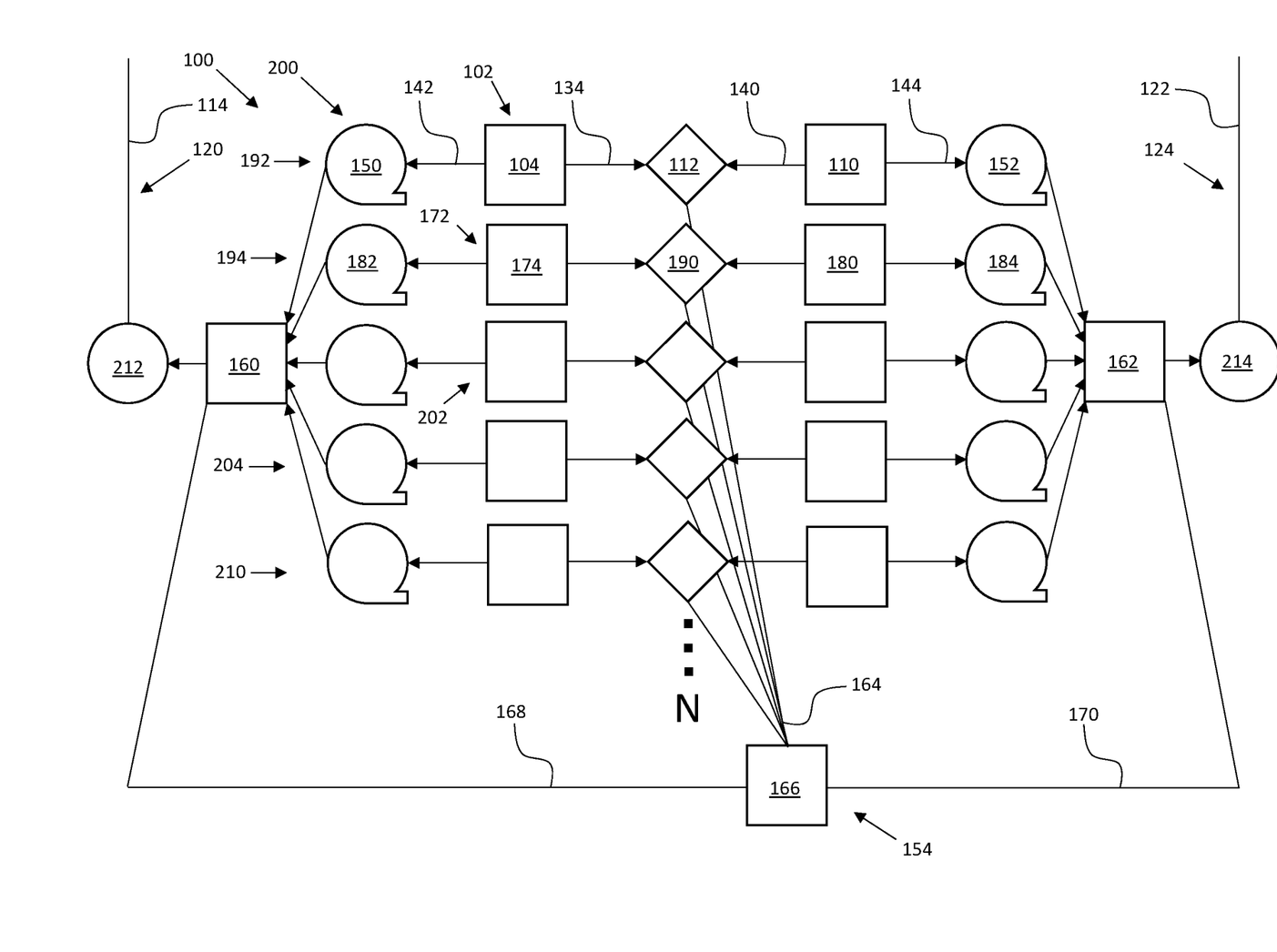
FIG. 1 is a schematic diagram of an apparatus connected with a first network and a second network according to the present subject matter.

Referring now to the drawing, FIG. 1 depicts an apparatus 100 including a first pair of entanglement sources 102 configured to generate a pair of swap-heralded photons by using a first entanglement source 104 and a second entanglement source 110 as two collocated SPDC sources. The apparatus 100 also includes a first Bell state measurement (BSM) device 112 which facilitates a local entanglement swap to identify and discard multi-pair creation events before transmission onto first lossy channels 114 included in a first network 120 that is a terrestrial network, and second lossy channels 122 included in a second network 124 that is a space network. As will be understood by one of ordinary skill in the art, the first network and second network may have various implementations. For example, the first and second networks may both be terrestrial networks or the first and second networks may both be space networks.

The first pair of entanglement sources 102 are connected with each other and configured to respectively generate a first pair of entangled photons and a second pair of entangled photons at the same time. More specifically, the first entanglement source 104 and the second entanglement source 110 are configured for being actuated together at the same time, where the first entanglement source 104 generates a first pair of entangled photons at the same time as the second entanglement source 110 generates a second pair of entangled photons.

In the depicted embodiment, the first entanglement source 104 and the second entanglement source 110 each, as an SPDC source, include a non-linear crystal pumped with a laser to respectively produce a first pair of entangled photons and a second pair of entangled photons. While the depicted first pair of entanglement sources 102 include non-linear crystals as SPDC sources, the first entanglement source 104 and the second entanglement source 110 may each additionally or alternatively include a variety of devices configured for producing a pair of entangled photons for delivery to the first BSM device 112 without departing from the scope of the present disclosure. Embodiments of the present application may include any probabilistic source of entangled photons including sources where there is a possibility of generating more than one pair of entangled photons at the same time. For example, four wave mixing can be expressed as Sum Frequency Generation or Difference Frequency Generation.

The first BSM device 112 generates a linear optical Bell state measurement associated with the first pair of entanglement sources 102. In an exemplary embodiment of the first BSM device 112, the device is connected to the first pair of entanglement sources 102 by any suitable method, e.g., fiber, air-to-ground, ground-to-air, etc. The first BSM device 112 detects photons generated by each of the first entanglement source 104 and the second entanglement source 110. The first BSM device 112 may include a beam splitter configured to direct photons from each entanglement source to a pair of photodetectors. The photons may impinge on the beam splitter in the BSM device 112 at the same time and exit ports of the beam splitter that are directed to the photodetectors. The photodetectors are configured to detect photons from the first entanglement source 104 and the second entanglement source 110. Next, the photodetectors generate a linear optical Bell state measurement associated with the first pair of entanglement sources 102.

The first BSM device 112 is also configured to perform an entanglement swap with photons generated by the first entanglement source 104 and the second entanglement source 110. An entanglement swapping protocol can be realized with the first BSM device 112 by combining a first inner channel 134 that is an idler channel on the first entanglement source 104 and a second inner channel 140 that is a signal channel on the second entanglement source 110. In an embodiment, the first inner channel 134 and the second inner channel 140 are combined on a beam-splitter in the first BSM device 112.

If a polarization measurement after the beam-splitter in the first BSM device 112 reveals that a pair of photons have opposite polarizations, then the state in a first outer channel 142 on the first entanglement source 104 and a second outer channel 144 on the second entanglement source 110 is projected onto either the Bell state $|\psi+\rangle$ if both photons are detected in a same output channel of the beam-splitter, or the Bell state $|\psi-\rangle$ if the photons are detected in opposite output channels of the beam-splitter. In the latter case, information obtained from the measurement is used to apply a phase shift in the first outer channel 142 and the second outer channel 144 to transform the state $|\psi-\rangle$ to the state $|\psi+\rangle$.

In the circumstance that a pair of photons in the first inner channel 134 and the second inner channel 140 are detected in a same polarization state, an entangled state is not created between corresponding photons in the first outer channel 142 and the second outer channel 144, and the entanglement swap protocol fails. Thus, on average, 50% of the time the first pair of entanglement sources 102 produces a specified entangled photon pair state (e.g., $|\psi+\rangle$) in the first outer channel 142 and the second outer channel 144, which are undetected channels.

As undetected channels, the first outer channel 142 and the second outer channel 144 are not configured to detect photons traveling therethrough. Instead, photons traveling through the first outer channel 142 and the second outer channel 144 are heralded by the first BSM device 112 with corresponding photons from the first inner channel 134 and the second inner channel 140.

Multiple pairs of photons entering the first network 120 and the second network 124 from the first pair of entanglement sources 102 can be avoided, provided that perfectly efficient photon number resolving detectors are employed in the first BSM device 112. In this regard, when the first BSM device 112 detects more than two photons on the first inner channel 134 and the second inner channel 140, which corresponds to a contribution of a multi-pair state from the first pair of entanglement sources 102, the photons in the first outer channel 142 and the second outer channel 144 are rejected from the first network 120 and the second network 124, which will be discussed herein with respect to the first and second optical switches 160, 162.

The apparatus 100 includes at least one memory connected with the first pair of entanglement sources 102 to store photons generated by the first entanglement source 104 and the second entanglement source 110. More specifically, the apparatus 100 includes a first memory 150 connected with the first outer channel 142 of the first entanglement source 104 for storing photons generated by the first entanglement source 104. The photons from the first entanglement source 104 are stored in the first memory 150 while the apparatus 100 determines whether the first pair of entanglement sources 102 contributed a multi-pair state to the BSM device 112. The apparatus 100 also includes a second memory 152 connected with the second outer channel 144 of the second entanglement source 110 for storing photons generated by the second entanglement source 110. The photons from the second entanglement source 110 are stored in the second memory 152 while the apparatus 100 determines whether the first pair of entanglement sources 102 contributed a multi-pair state to the BSM device 112.

In the depicted embodiment, the first memory 150 and the second memory 152 may each include an optical delay line configured for receiving and storing photons from the first pair of entanglement sources 102. While, as depicted, the first memory 150 and the second memory 152 include optical delay lines for receiving and storing photons, the first memory 150 and the second memory 152 may additionally or alternatively include a variety of devices configured for receiving, storing, and releasing entangled photons on an optical circuit without departing from the scope of the present disclosure.

The apparatus 100 includes a herald output 154 configured for determining whether the first pair of entanglement sources 102 contributed a multi-pair state to the first BSM device 112, and includes at least one optical switch connected with the first memory 150, the second memory 152, and the herald output 154 to selectively release photons to at least one network based on the number of photons detected by the first BSM device 112. More specifically, the apparatus 100 includes a first optical switch 160 connected with the first memory 150 and the first BSM device 112, where the first optical switch 160 is configured to selectively release photons from the first memory 150 to the first network 120 based on the number of photons detected by the first BSM device 112, as determined by the herald output 154. The apparatus 100 also includes a second optical switch 162 connected with the second memory 152 and the first BSM device 112, where the second optical switch 162 is configured to selectively release photons from the second memory 152 to the second network 124 based on the number of photons detected by the first BSM device 112, as determined by the herald output 154.

As noted above, photons traveling through the first outer channel 142 and the second outer channel 144 are heralded by the first BSM device 112 performing an entanglement swap with corresponding photons from the first inner channel 134 and the second inner channel 140. With this construction, the first optical switch 160 and the second optical switch 162 may not require detection of photons in either of the first outer channel 142 and the second outer channel 144 to release heralded photons to the first network 120 and the second network 124.

The herald output 154 includes an electronic circuit 164 and a processor 166 connected with the first BSM device 112 for determining a number of photons detected by the first BSM device 112 and for actuating the first optical switch 160 and the second optical switch 162. In this regard, a linear optical Bell state measurement generated by the first BSM device 112 may be an electronic signal delivered to the herald output 154 via the electronic circuit 164, and the processor 166 may function to determine a number of photons detected by the first BSM device 112 at the same time based on the electronic signal received from the first BSM device 112.

The herald output 154 may then function as a switch controller and thus be further configured to send a control signal to the first optical switch 160 and the second optical switch 162 for respectively releasing, or not releasing, photons from the first memory 150 and the second memory 152 to the first network 120 and the second network 124. The processor 166 is connected to the first optical switch 160 via a first communication line 168 included in the circuit 164 for sending the control signal to the first optical switch 160, and is connected to the second optical switch 162 via a second communication line 170. Additionally, the herald output 154 can be provided to the rest of the network, 212, 214. This herald is beneficial as it can be used to filter out noise at the next network node. If there is a photodetection at a next node in the network but the herald output 154 is not received, the detection may be classified as noise.

This control signal, sent from the herald output 154 to the optical switches 160, 162, is based on the corresponding electronic signal delivered to the herald output 154 from the first BSM device 112. In this manner, the processor 166 controls the first optical switch 160 and the second optical switch 162 by means of the control signal so as to release photons from the first pair of entanglement sources 102 to the first network 120 and the second network 124 when two photons are detected by the first BSM device 112 at the same time, and to restrict photons from entering the first network 120 and the second network 124 when more or less than two photons are detected by the first BSM device 112 at the same time.

As such, the first optical switch 160 and the second optical switch 162 restrict photons from entry onto the first network 120 and the second network 124 when one of the first entanglement source 104 and the second entanglement source 110 generates one pair of photons, and the other of the first entanglement source 104 and the second entanglement source 110 does not generate any pairs of photons at the same time, resulting in the BSM device 112 detecting only one photon. Also, the first optical switch 160 and the second optical switch 162 restrict photons from entry onto the first network 120 and the second network 124 when one of the first entanglement source 104 and the second entanglement source 110 generates at least two pairs of photons, and the other of the first entanglement source 104 and the second entanglement source 110 generates at least one pair of photons at the same time, resulting in the BSM device 112 detecting at least three photons.

The a) amount of time it takes for a photon from the first pair of entanglement sources 102 to reach and travel through the first memory 150 and the second memory 152 and reach the respective optical switch 160, 162, may be greater than b) the amount of time it takes for a photon from the first pair of entanglement sources 102 to reach and be detected by the first BSM device 112, for the herald output 154 to determine the number of photons detected by the first BSM device 112, and then for the herald output 154 to send the control signal to the first optical switch 160 and the second optical switch 162 via the electronic circuit 164 based on the number of photons detected by the first BSM device 112. In this manner, the first memory 150 and the second memory 152 may be configured for storing photons a sufficient amount of time for the first optical switch 160 and the second optical switch 162 to receive the control signal from the herald output 154, and thus allows the optical switches 160, 162 to release or restrict the photons from the memories 150, 152 for entry onto the respective first network 120 and second network 124 based on the control signal from the herald output 154, the control signal being generated based on the corresponding detection by the BSM device 112.

Effectiveness of the apparatus 100 may depend on a detection efficiency and photon number resolving power of the first BSM device 112 on the first inner channel 134 and the second inner channel 140. In the case of a linear detection process with detection efficiency η (i.e., best case photon number resolution) the probability of a successful entanglement swap may be represented by the following equation (1):

$$p_s = \frac{1}{2}\eta^2 p(1)^2. \tag{1}$$

With reference to equation (1) above, the factor of ½ represents a successful projection onto a Bell state in the first outer channel 142 and the second outer channel 144 occurring when the photons on the first inner channel 134 and the second inner channel 140 are detected with opposite polarizations. On the other hand, the probability of a false swap, where no photons are emitted from one of the first entanglement source 104 and the second entanglement source 110 at the same time may be represented by the following equation (2):

$$p_f = \frac{2}{3}\eta^2 p(2)p(0). \tag{2}$$

With reference to equation (2) above, the factor of ⅔ represents an observation that a single channel of the double-pair state emitted by each of the first entanglement source 104 and the second entanglement source 110 contains photons of opposite polarizations may occur only ⅓ of the time due to effects of stimulated emission. Finally, the probability of an erroneous swap where 3 or more photons are emitted into the first outer channel 142 and the second outer channel 144 contains a contribution from all of the higher order pairs produced, but the leading order term—corresponding to the case where one source produces a double-pair, one source produces a single pair, and one inner channel photon was lost—may be represented by the following equation (3):

$$p_e = 2\eta(1-\eta)p(1)p(2). \tag{3}$$

With reference to equation (3) above, the leading factor is obtained by expanding the 3-photon states in a tensor product and extracting the probability that only one horizontal photon and one vertical photon is detected on the first inner channel 134 and the second inner channel 140. The result is that half of the 3-photon states in the expansion contain 2 photons of opposite polarization on the first inner channel 134 and the second inner channel 140, and in each case there are two ways to lose one of the photons and still detect only two photons of opposite polarizations leading to an erroneous swap rate of η2(1−n)p(1)p(2). The leading factor of 2 arises from the sum of the two cases corresponding to which one of the first entanglement source 104 and the second entanglement source 110 was the double-pair emitter.

In view of equations (1)-(3) above, it is possible to describe suppression of the multi-pair production that can be achieved with the first pair of entanglement sources 102 and the BSM device 112 as a swap-heralded entangled pair source (EPS). In this regard, a ratio of erroneous swaps where a multi-pair state is released into one of the first outer channel 142 and the second outer channel 144 to the successful swaps where a true entangled pair state is emitted may be represented by the following equation (4):

$$\frac{p_e}{p_s} = 4(1-\eta)\frac{p(2)}{p(1)}. \tag{4}$$

With reference to equation (4) above, for a single swap-heralded SPDC EPS, this error ratio may be only p(2)/p(1). With perfect detection efficiency on the first inner channel 134 and the second inner channel 140, complete suppression of multi-pair production from the swap-heralded SPDC EPS may be achieved. More generally, this method provides a suppression of multi-pair emissions relative to single pair emissions, provided that the detection efficiency of the first BSM device 112 on the first inner channel 134 and the second inner channel 140 satisfies η>0.75.

A probability that no swap is recorded also puts a limit on the overall photon pair rate coming from a single swap-heralded SPDC EPS. As noted above, this probability includes a contribution from all higher order pairs. However, considering only an approximation up to the case of 3 total pairs produced between both sources, it may be possible to estimate the probability as shown in the following equation (5):

$$p_0 = 1 - p_s - p_f - p_e. \tag{5}$$

With reference to equation (5) above, the latter two approximations may be valid, provided that $|\lambda|^2 \ll 1$ in corresponding to a single pair production rate $p(1) \approx 2|\lambda|^2 \ll 1$. Based on the above analysis, it may be possible to describe the pair production statistics for a single swap-heralded SPDC EPS in terms of the single parameter $\alpha = \lambda^2$ which characterizes pair production for a single swap-heralded SPDC EPS. Notably, for $\alpha \ll 1$, the parameter $\alpha$ may roughly corresponds to ½ the probability that a single pair is produced by the single swap-heralded SPDC EPS.

Using an expression for multi-pair production from a single swap-heralded SPDC EPS, the probability of producing a swap-heralded entangled pair may be represented by the following equation (6):

$$p_s = 2\eta^2(1-\alpha)^4 \cdot \alpha 2 \approx 2\eta^2 \alpha^2. \tag{6}$$

Other probabilities characterizing distinct types of failed pair-production may be represented by the following equations (7)-(9):

$$p_f = 2\eta^2(1-\alpha)^4 \alpha 2 \approx 2\eta^2 \alpha^2, \tag{7}$$

$$p_e = 12\eta^2(1-\eta)(1-\alpha)^4 \alpha^3 \approx 12\eta^2(1-\eta)\alpha^3 \tag{8}$$

$$p_o = 1 - 4\eta^2(1-\alpha)^4 \alpha 2[1+3(1-\eta)\alpha]. \tag{9}$$

Notably, the probability of releasing a swap-heralded state with no photons from one of the first entanglement source 104 and the second entanglement source 110 may be precisely the same as the probability of releasing a true swap-heralded entangled pair state. There is no direct analog of this case for a single swap-heralded EPS for which the number of photons emitted in each of the first lossy channel 114 and the second lossy channel 122 as output channels is perfectly correlated; however, it is somewhat analogous to a case where one of the first lossy channel 114 and the second lossy channel 122 experiences loss before the photons reach a destination on one of the first network 120 and the second network 124. By itself, this form of loss on the first lossy channel 114 and the second lossy channel 122 does not introduce noise into a signal on a distributed quantum communication system based on the first network 120 and the second network 124, but this loss would need to be considered in view of an overall acceptable amount of power loss in a given optical system, i.e., a loss budget, for any entanglement distribution application.

With respect to reduction of double-pair states that are erroneously admitted into the first outer channel 142 and the second outer channel 144 in terms of the parameter α, the ratio considered in the above analysis may be represented by the following equation (10):

$$\frac{p_e}{p_s} = 6(1-\eta)\alpha \qquad (10)$$

For a single swap-heralded EPS, this error ratio may be represented by $p(2)/p(1)=(3/2)\alpha$ so that, as noted above, a suppression of multi-pair production relative to single pair production may be achieved provided that the detection efficiency on the first inner channel 134 and the second inner channel 140 is greater than 75%. If the detection efficiency can be further improved, a k-fold reduction on detection losses may yield a corresponding k-fold reduction in relative multi-pair emissions, so that by this estimate a detection efficiency of roughly 87.5% may lead to a 3 dB suppression of multi-pair emissions. Such detection efficiencies may be achieved using superconducting nanowire single-photon detectors (SNSPDs).

Even in the case of perfect detection efficiency on the first inner channel 134 and the second inner channel 140, where η=1, the probability that no swap is heralded at all may be represented by the following equation (11):

$$p_0 = 1-4(1-\alpha)^4\alpha^2 \approx 1-4\alpha^2 \qquad (11)$$

With reference to equation (11) above, where α is small, this may result in a very large probability that the source does not produce an entangled pair at all. By contrast, for a single SPDC source, the probability that no pairs are emitted may be represented by the following equation (12):

$$p_0 = (1-\alpha)^2\alpha^2 \approx 1-2\alpha \qquad (12)$$

With photon pair emission heralded by a Bell state measurement, the apparatus 100 may support a multiplex of many swap-heralded EPS on an active switching mechanism to release only a single entangled pair at a time. In view of this, any limitation for employing a swap-heralded EPS may be mitigated by multiplexing arrays of swap-heralded EPS running in parallel, together with an active switching mechanism to release a single photon pair from only one successfully heralded swap at a time. Furthermore, by employing arrays of swap-heralded EPS together with an active optical switching mechanism to selectively reject multi-pair production events, the apparatus 100 as a whole is configured to provide a high-rate source of single photon pairs. Notably, with arrays of swap-heralded EPS provided in the apparatus 100, an upper bound on the number of double pairs may be limited only by the detection efficiency of employed BSM devices, including the first BSM device 112.

With continued reference to FIG. 1, the apparatus 100 includes a second pair of entanglement sources 172 including a third entanglement source 174 and a fourth entanglement source 180 configured to generate a third pair of entangled photons and a fourth pair of entangled photons at the same time. The third entanglement source 174 is connected with a third memory 182 to store photons generated by the third entanglement source 174, and the fourth entanglement source 180 is connected with a fourth memory 184 to store photons generated by the fourth entanglement source 180.

In this manner, the second pair of entanglement sources 172 is connected with at least one memory to store photons generated by the third entanglement source 174 and the fourth entanglement source 180. The third memory 182 is connected with the first optical switch 160 for releasing photons from the third entanglement source 174 to the first network 120, and the fourth memory 184 is connected with the second optical switch 162 for releasing photons from the fourth entanglement source 180 to the second network 124.

The apparatus 100 includes a second BSM device 190 connected with the second pair of entanglement sources 172 to detect photons generated by each of the third entanglement source 174 and the fourth entanglement source 180. The second pair of entanglement sources 172, the third memory 182, the fourth memory 184, and the second BSM device 190 include similar features and function in a similar manner as the first pair of entanglement sources 102, the first memory 150, the second memory 152, and the first BSM device 112.

The first pair of entanglement sources 102 and the first BSM device 112 define a first array 192 connected with the herald output 154, the first optical switch 160, and the second optical switch 162 to produce a first pair of swap-heralded photons at the at the first optical switch 160 and the second optical switch 162. The second pair of entanglement sources 172 and the second BSM device 190 define a second array 194 connected with the herald output 154, the first optical switch 160, and the second optical switch 162 in parallel with the first array 192 to produce a second pair of swap-heralded photons at the at the first optical switch 160 and the second optical switch 162.

The first array 192 and the second array 194 are configured for being actuated together. As such, the first pair of entanglement sources 102 and the second pair of entanglement sources 172 are configured to generate a first pair of photons, a second pair of photons, a third pair of photons, and a fourth pair of photons at the same time.

The apparatus 100 includes a multiplex 200 of the five depicted arrays in FIG. 1, including the first array 192, the second array 194, a third array 202, a fourth array 204, and a fifth array 210 connected in parallel with the first optical switch 160 and the second optical switch 162. The arrays 192-210 in the multiplex 200 are each a swap-heralded EPS, and include similar features and function in a similar manner as each other for producing entangled pairs of photons at the first optical switch 160 and the second optical switch 162 at the same time.

As will be described in greater detail below, the apparatus 100 can include many arrays in the multiplex 200 for producing entangled pairs of photons at the first optical switch 160 and the second optical switch 162 at the same time, where increasing the number of arrays in the multiplex 200 increases the reliability with which the multiplex 200 successfully produces at least one pair of entangled photons at the first optical switch 160 and the second optical switch 162 at the same time. In this regard, the multiplex is depicted in FIG. 1 as including N number of arrays, corresponding with a desired reliability in producing entangled pairs of photons at the first optical switch 160 and the second optical switch 162 at the same time. Similar to the depicted arrays 192-210, each array of the N number of arrays in the multiplex 200 includes similar features and functions in a similar manner as the first array 192.

With this construction, an embodiment of the depicted apparatus 100 includes the multiplex 200 with at least ten arrays (i.e., where N=10), including the first array 192 and the second array 194, connected with the herald output 154, the first optical switch 160, and the second optical switch 162 in parallel. In such an embodiment, each of the ten arrays in the multiplex 200 is configured to produce a pair of swap-heralded photons at the first optical switch 160 and the second optical switch 162.

More broadly, the apparatus 100 includes the multiplex 200 of arrays N, where each array is configured to produce swap-heralded pairs of entangled photons. In this regard, each of the N arrays include a pair of entanglement sources similar to the first pair of entanglement sources 102, and configured to generate two pairs of entangled photons at the same time. Each of the N arrays also include a BSM device similar to the first BSM device 112, and connected with the pair of entanglement sources to detect photons generated by each entanglement source in the pair of entanglement sources. Each of the N arrays also includes at least one optical switch similar to the first optical switch 160 and the second optical switch 162, and connected with each array where the at least one optical switch is configured to selectively release photons from the pairs of entanglement sources to the first network 120 and the second network 124 based on a number of photons detected by the corresponding BSM device.

The N arrays in the multiplex 200 are configured for being actuated together, such that each pair of entanglement sources in the multiplex 200 of N arrays generates two pairs of photons at the same time. The first optical switch 160 and the second optical switch 162 are configured to release photons from a single array in the multiplex 200 at the same time.

As such, arrays which produce no photons are neglected by the first optical switch 160 and the second optical switch 162, where the first optical switch 160 and the second optical switch 162 are not actuated to release one pair of photons to the first network 120 and the second network 124. Further, the first optical switch 160 and the second optical switch 162 are actuated open to one array which heralded photons from a BSM device, and actuated closed to all other arrays to discard redundant photon pairs generated at the same time.

With this construction and functioning, the apparatus 100 is configured to reliably release a single pair of entangled photons at a time. In this manner, the apparatus 100 enables multiplexing of multiple swap-heralded EPS's into a single pair of output channels to increase a brightness of the apparatus 100 beyond that of a single EPS, which is limited by the single pair probability. Notably, in sufficient scale, the plurality of N arrays reduces the number of multi-pairs emitted relative to single pairs by a factor that may be limited only by the detection efficiency of the BSM.

As noted above, the probability that any given pair of entanglement sources registers an entanglement swap may be roughly $4\alpha^2$, provided $\alpha \ll 1$. Using the multiplex 200, it may be possible to increase the probability of registering at least one swap such that registering at least one swap is bound to occur by employing N=¼α2 independent swaps. Employing SPDC sources with a single pair production probability of 2α=0.05 may require multiplexing 400 independent swap-heralded EPS's. However, using this many EPS's may not be necessary to recover the single pair emission rate typical of a single swap-heralded SPDC EPS. For the previous example, one may recover a typical single-pair emission rate of $p_s$=0.05 by employing roughly 40 swap-heralded EPS's.

Embodiments of the multiplex 200 include arrays employing a high efficiency regime $Np_s \gg 1$ corresponding to an array such that many swaps are heralded every time the arrays in the multiplex 200 are actuated, and include arrays employing a low efficiency regime $Np_s \ll 1$ corresponding to an array where, on average, much less than one swap is heralded at a time the arrays in the multiplex 200 are actuated. Regarding high efficiency arrays employed in the multiplex 200, although a heralded swap may be carried out with near unit probability $p_s+p_f+p_e \sim 1$ by making N large, the maximum true entangled pair rate may be limited by the probability of false swaps $p_f+p_e$.

Using the above analysis, an upper bound for the true entangled pair emissions of the multiplex 200 may be determined. In the limit of a large number of EPS's, such that many swaps are heralded in the multiplex 200 every time the arrays in the multiplex 200 are actuated, since the first optical switch 160 and the second optical switch 162 may admit equally, both for the true entangled pairs and the false heralded swaps, the probability of emission of a true entangled pair may be limited by the ratio of true swaps to total heralded swaps, which may be represented by the following equation (13):

$$P_s = \frac{p_s}{p_s + p_f + p_e} = \frac{1}{2 + 6(1-\eta)\alpha} \leq \frac{1}{2}, \quad (Np_s \gg 1). \tag{13}$$

With reference to equation (13) above, since $\alpha$ and $(1-\eta)$ may be small, the successful entangled pair probability in the apparatus 100 may ultimately be limited by ½ due to the swap having an equal probability of being triggered by a single pair emission from both sources, or a double-pair from one source together with no pair from the second source, i.e., $p_s=p_f$. As such, including a large number of arrays in the multiplex 200 may increase the single-pair emission rate so that it is very close to ½.

The error ratio $P_e/P_s$ for the multiplex 200 may be governed by the same bounds as for a single swap-heralded EPS, because over a large number M time of actuating the arrays in the multiplex 200, the average number of true heralded swaps may be $\mu_s=MNp_s$, whereas the average number of erroneous swaps leading to the potential emission of multiple photons in a single channel may be $\mu_e=MNp_e$. The following equation (14) may be derived from the first optical switch 160 and the second optical switch 162 choosing equally between all heralded swaps:

$$\frac{P_e}{P_s} = \frac{\mu_e}{\mu_s} = \frac{p_e}{p_s} \simeq 6(1-\eta)\alpha \tag{14}$$

As shown above, by employing a very large number of swap-heralded EPS's in the multiplex 200, one may be able to obtain a source of entangled photon pairs with an emission rate approaching ½ the pulse repetition rate of the individual pulsed SPDC sources. Furthermore, the suppression of multi-pair emissions relative to single entangled pair emissions may be limited only by the efficiency of detection in the local entanglement swaps, at the BSM devices included in the multiplex 200.

An embodiment of the multiplex 200 may employ low-efficiency arrays $Np_s \ll 1$ corresponding to a case where, on average, much fewer than one swap is heralded in the multiplex 200 every time the arrays in the multiplex 200 are actuated. This type of performance is analogous to a single SPDC source for which a pump pulse produces a pair only with a small probability. In such a case, the probability of a successful swap may be represented by $P_s=Np_s$, and the probability of an erroneous multi-photon emission into one of the outer channels may be $P_e=Np_e$. Using the expressions for $p_s$ and $p_e$ derived above, it is possible to obtain the following equation (15):

$$P_e = \sqrt{\frac{18}{N}}\left(\frac{1-\eta}{\eta}\right)P_s^{3/2}, \quad (Np_s \ll 1). \tag{15}$$

Notably, the probability of double-pair emission from the single SPDC source scales with the square of the single-pair emission probability, as represented by the following equation (16):

$$p(2) = \frac{3}{4}p(1)^2. \tag{16}$$

In contrast to the probability of double-pair emission from the single SPDC source represented by equation (16) above, the probability of the multi-photon emissions in the swap-heralded array scales with the single pair probability with a 3/2 exponent. At the same time, by inverting these two expressions, this implies that for a specified target multi-photon emission probability $P_e$, there is a minimum number of source-pairs that may be required for an array to achieve a single-pair probability that exceeds that of a single SPDC source, which may be represented by the following equation (17):

$$N = 16\sqrt{\frac{3}{P_e}}\left(\frac{1-\eta}{\eta}\right)^2. \tag{17}$$

In the case that one of the first entanglement source 104 and the second entanglement source 110 produces a double-pair and the other of the first entanglement source 104 and the second entanglement source 110 produces no pair, the BSM device 112 may not be able to identify generation of the double-pair. However, in this case, one of the first outer channel 142 and the second outer channel 144 is in a vacuum state, and so this case may simply result in an increase in loss in the entanglement distribution link, which for some purposes may be far less detrimental than the added noise due to unidentified double-pairs in the outer channels.

The first network 120 includes a first port 212 connected with the first optical switch 160 to receive photons from the first entanglement source 104, and the second network 124 includes a second port 214 connected with the second optical switch 162 to receive photons from the second entanglement source 110. The first optical switch 160 is configured to selectively release photons generated by the first entanglement source 104 into the first port 212 based on the number of photons detected by the first BSM device 112. The second optical switch 162 is configured to selectively release photons generated by the second entanglement source 110 into the second port 214 based on the number of photons detected by the first BSM device 112.

The first port 212 and the second port 214 are each configured to determine a vacuum state in which no photons are received from at least one of the first optical switch 160 and the second optical switch 162. Further, the first network 120 and the second network 124 are configured to halt communication with the first optical switch 160 and the second optical switch 162 when a vacuum state is detected in at least one of the first port 212 and the second port 214.

A method of providing a pair of swap-heralded photons to the first network 120 and the second network 124 includes actuating the first pair of entanglement sources 102 including the first entanglement source 104 and the second entanglement source 110 to generate a first pair of entangled photons and a second pair of entangled photons at the same time. The method also includes detecting a number of photons generated by the first entanglement source 104 and the second entanglement source 110 at the same time using the first BSM device 112, wherein an entanglement swap is performed between the first pair of entangled photons and the second pair of entangled photons. The method also includes releasing photons from the first pair of entangled photons and the second pair of entangled photons to the first network 120 and the second network 124 with at least one optical switch based on the number of photons detected by the first BSM device 112.

The method also includes storing photons from the first pair of entangled photons and the second pair of entangled photons in the first memory 150 and the second memory 152. The method also includes heralding photons from the first pair of entangled photons and the second pair of entangled photons stored in the first memory 150 and the second memory 152 with the heralding output 154 that includes the electronic circuit 164 connected with the first BSM device 112 and the first optical switch 160 and the second optical switch 162. The electronic circuit 164 is configured to determine the number of photons detected by the first BSM device 112 and send the control signal to the first optical switch 160 and the second optical switch 162 based on the determined number of photons detected by the first BSM device 112. The step of releasing photons from the first pair of entangled photons and the second pair of entangled photons to the first network 120 and the second network 124 includes releasing the photons from the first memory 150 and the second memory 152 by actuating the first optical switch 160 and the second optical switch 162 based on the control signal.

The method also includes actuating the second pair of entanglement sources 172 including the third entanglement source 174 and the fourth entanglement source 180 to generate a third pair of entangled photons and a fourth pair of entangled photons at the same time the first entanglement source 104 and the second entanglement source 110 generate the first pair of entangled photons and the second pair of entangled photons. The method also includes detecting a number of photons generated by the third entanglement source 174 and the fourth entanglement source 180 at the same time using a second BSM device 190, where an entanglement swap is performed between the third pair of entangled photons and the fourth pair of entangled photons. The step of releasing photons to the first network 120 and the second network 124 includes releasing a single pair of photons generated from one of the first pair of entanglement sources 102 and the second pair of entanglement sources 172 at the same time based on the number of photons detected by the first BSM device 112 and the second BSM device 190.

Although embodiments described herein have been discussed in terms of entangled photon pair states such as those produced by an entanglement source such as SPDC, it should be understood that the present apparatus may be applicable to any probabilistic source of entangled photons where there is a possibility of generating more than one pair of entangled photons at the same time. Thus, the term entanglement source is not intended to denote a single source of entangled photon sources and may include other processes such as four wave mixing expressed as Sum Frequency Generation or Difference Frequency Generation. One of ordinary skill in the art would recognize many variations, modifications, and alternatives.

It will be appreciated that various of the above-disclosed embodiments and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. An apparatus comprising:
a first pair of entanglement sources including a first entanglement source and a second entanglement source configured to generate a first pair of entangled photons and a second pair of entangled photons at a same time;
a first Bell state measurement device connected with the first pair of entanglement sources to detect photons generated by the first entanglement source and the second entanglement source;
at least one memory connected with the first pair of entanglement sources to store photons generated by the first entanglement source and the second entanglement source;
a herald output including an electronic circuit connected with the first Bell state measurement device for determining a number of photons detected by the first Bell state measurement device; and
at least one optical switch connected with the at least one memory and the herald output, wherein the at least one optical switch is configured to selectively release photons from the at least one memory to a network based on the number of photons detected by the first Bell state measurement device.

2. The apparatus according to claim 1, wherein the at least one optical switch is configured to release photons from the first pair of entanglement sources to a network when two photons are detected by the first Bell state measurement device at a same time, and restrict photons from entering a network when more or less than two photons are detected by the first Bell state measurement device at a same time.

3. The apparatus according to claim 1, wherein the first Bell state measurement device is configured to perform an entanglement swap with photons generated by the first entanglement device and the second entanglement device.

4. The apparatus according to claim 1, wherein the at least one memory includes a first memory connected with the first entanglement source for storing photons generated by the first entanglement source, and a second memory connected with the second entanglement source for storing photons generated by the second entanglement source.

5. The apparatus according to claim 4, wherein the at least one optical switch includes a first optical switch connected with the first memory and the first Bell state measurement device, wherein the first optical switch is configured to selectively release photons from the first memory to a network based on the number of photons detected by the first Bell state measurement device, and
wherein the at least one optical switch includes a second optical switch connected with the second memory and the first Bell state measurement device, wherein the second optical switch is configured to selectively release photons from the second memory to a network based on the number of photons detected by the first Bell state measurement device.

6. The apparatus according to claim 1, further comprising at least one network including a first port connected with the at least one optical switch to receive photons from the first entanglement source, and including a second port connected with the at least one optical switch to receive photons from the second entanglement source,
wherein the at least one optical switch is configured to selectively release photons generated by the first entanglement source into the first port, and selectively release photons generated by the second entanglement source into the second port based on the number of photons detected by the first Bell state measurement device, and
wherein the first port and the second port are each configured to determine a vacuum state in which no photons are received from the at least one optical switch, and the at least one network is configured to halt communication with the at least one optical switch when a vacuum state is detected in at least one of the first port and the second port.

7. The apparatus according to claim 1, further comprising:
a second pair of entanglement sources including a third entanglement source and a fourth entanglement source configured to generate a third pair of entangled photons and a fourth pair of entangled photons at a same time, wherein the second pair of entanglement sources are connected with the at least one memory to store photons generated by the third entanglement source and the fourth entanglement source; and
a second Bell state measurement device connected with the second pair of entanglement sources to detect photons generated by the third entanglement source and the fourth entanglement source,
wherein the first pair of entanglement sources and the first Bell state measurement device define a first array connected with the herald output and the at least one optical switch to produce a first pair of swap-heralded photons at the at least one optical switch, and
the second pair of entanglement sources and the second Bell state measurement device define a second array connected with the herald output and the at least one optical switch in parallel with the first array to produce a second pair of swap-heralded photons at the at least one optical switch.

8. The apparatus according to claim 7, wherein the first array and the second array are configured for being actuated together, such that the first pair of entanglement sources and the second pair of entanglement sources generate a first pair of photons, a second pair of photons, a third pair of photons, and a fourth pair of photons at a same time.

9. The apparatus according to claim 7, wherein the apparatus includes a multiplex of at least ten arrays, including the first array and the second array, connected with the herald output and the at least one optical switch in parallel,
wherein each array of the multiplex of at least ten arrays is configured to produce a pair of swap-heralded photons at the at least one optical switch, and comprises:
a pair of entanglement sources connected with the at least one optical switch through the at least one memory and configured to generate two pairs of entangled photons at a same time; and a Bell state measurement device connected with the pair of entanglement sources to detect photons generated by the pair of entanglement sources.

10. The apparatus according to claim 1, wherein the first pair of entanglement sources includes a non-linear crystal pumped with a laser to produce a pair of entangled photons.

11. The apparatus according to claim 1, wherein the first Bell state measurement device includes a photodetector connected with the first pair of entanglement sources to generate a linear optical Bell state measurement as an electric signal delivered to the herald output via the electronic circuit.

12. The apparatus according to claim 1, wherein the at least one memory includes an optical delay line configured for receiving and storing photons from the first pair of entanglement sources such that a) an amount of time it takes for a photon from the first pair of entanglement sources to reach and travel through the optical delay line, wherein the photon is stored by the optical delay line, is greater than b) an amount of time it takes for a photon from the first pair of entanglement sources to reach and be detected by the first Bell state measurement device, for the herald output to determine the number of photons detected by the first Bell state measurement device, and then for the herald output to send a control signal to the optical switch via the electronic circuit based on the number of photons detected by the first Bell state measurement device.

13. The apparatus according to claim 1, wherein the herald output includes a processor that functions as a switch controller configured to determine a number of photons detected by the Bell state measurement device at a same time based on an electric signal received from the Bell state measurement device via the electronic circuit, and send a control signal to the at least one optical switch.

14. An apparatus comprising:
a multiplex of arrays, wherein each array of the multiplex of arrays is configured to produce swap-heralded pairs of entangled photons and includes:
    a pair of entanglement sources configured to generate two pairs of entangled photons at a same time;
    a Bell state measurement device connected with the pair of entanglement sources to detect photons generated by each entanglement source in the pair of entanglement sources; and
at least one optical switch connected with each array of the multiplex of arrays, wherein the at least one optical switch is configured to selectively release photons from the pairs of entanglement sources to a network based on a number of photons detected by the corresponding Bell state measurement device.

15. The apparatus of claim 14, wherein the at least one optical switch is configured to release photons from a single array at a time.

16. The apparatus of claim 14, wherein the multiplex of arrays are configured for being actuated together, such that each pair of entanglement sources in the multiplex of arrays generates two pairs of photons at a same time.

17. The apparatus of claim 14, wherein the multiplex of arrays are connected to the optical switch in parallel with each other.

18. A method of providing a pair of swap-heralded photons to a network, the method comprising:
actuating a first pair of entanglement sources including a first entanglement source and a second entanglement source to generate a first pair of entangled photons and a second pair of entangled photons at a same time;
detecting a number of photons generated by the first entanglement source and the second entanglement source at the same time using a first Bell state measurement device, wherein an entanglement swap is performed between the first pair of entangled photons and the second pair of entangled photons; and
releasing photons from the first pair of entangled photons and the second pair of entangled photons to a network with at least one optical switch based on the number of photons detected by the first Bell state measurement device.

19. The method of claim 18, further comprising:
storing photons from the first pair of entangled photons and the second pair of entangled photons in at least one memory; and
heralding photons from the first pair of entangled photons and the second pair of entangled photons stored in the at least one memory with a heralding output that includes an electronic circuit connected with the first Bell state measurement device and the at least one optical switch, wherein the electronic circuit is configured to determine the number of photons detected by the first Bell state measurement device and send a control signal to the at least one optical switch based on the determined number of photons detected by the first Bell state measurement device;
wherein the step of releasing photons from the first pair of entangled photons and the second pair of entangled photons to a network includes releasing the photons from the at least one memory by actuating the at least one optical switch based on the control signal.

20. The method of claim 18, further comprising:
actuating a second pair of entanglement sources including a third entanglement source and a fourth entanglement source to generate a third pair of entangled photons and a fourth pair of entangled photons at the same time the first entanglement source and the second entanglement source generate the first pair of entangled photons and the second pair of entangled photons; and
detecting a number of photons generated by the third entanglement source and the fourth entanglement source at the same time using a second Bell state measurement device, wherein an entanglement swap is performed between the third pair of entangled photons and the fourth pair of entangled photons;
wherein the step of releasing photons to the network includes releasing a single pair of photons generated from one of the first pair of entanglement sources and the second pair of entanglement sources at the same time based on the number of photons detected by the first Bell state measurement device and the second Bell state measurement device.

* * * * *